US012670627B2

(12) United States Patent
Nash et al.

(10) Patent No.: US 12,670,627 B2
(45) Date of Patent: Jun. 30, 2026

(54) GENERATING IMAGES USING SPARSE REPRESENTATIONS

(71) Applicant: GDM Holding LLC, Mountain View, CA (US)

(72) Inventors: Charlie Thomas Curtis Nash, London (GB); Peter William Battaglia, London (GB)

(73) Assignee: GDM Holding LLC, Mountain View, CA (US)

( * ) Notice: Subject to any disclaimer, the term of this patent is extended or adjusted under 35 U.S.C. 154(b) by 285 days.

(21) Appl. No.: 18/275,048

(22) PCT Filed: Feb. 7, 2022

(86) PCT No.: PCT/EP2022/052895
§ 371 (c)(1),
(2) Date: Jul. 31, 2023

(87) PCT Pub. No.: WO2022/167659
PCT Pub. Date: Aug. 11, 2022

(65) Prior Publication Data
US 2024/0104785 A1 Mar. 28, 2024

Related U.S. Application Data

(60) Provisional application No. 63/146,474, filed on Feb. 5, 2021.

(51) Int. Cl.
*G06T 9/00* (2006.01)
*G06T 7/11* (2017.01)
*G06T 7/73* (2017.01)

(52) U.S. Cl.
CPC ............... *G06T 9/002* (2013.01); *G06T 7/11* (2017.01); *G06T 7/73* (2017.01);
(Continued)

(58) Field of Classification Search
CPC .. H04N 19/119; H04N 19/132; H04N 19/157; H04N 19/187; H04N 19/29;
(Continued)

(56) References Cited

U.S. PATENT DOCUMENTS 9,813,721 B2 * 11/2017 Schulze ............... H04N 19/157
10,058,290 B1 * 8/2018 Proud .................... A61B 5/749
(Continued)

FOREIGN PATENT DOCUMENTS

CN         112218094         1/2021

OTHER PUBLICATIONS

Ahmed et al., "Discrete Cosine Transform," IEEE Transactions on Computers, Jan. 1974, pp. 90-93.
(Continued)

*Primary Examiner* — Ming Wu
(74) *Attorney, Agent, or Firm* — Fish & Richardson P.C.

(57) ABSTRACT

Methods, systems, and apparatus, including computer programs encoded on computer storage media, for generating compressed representations of synthetic images. One of the methods is a method of generating a synthetic image using a generative neural network, and includes: generating, using the generative neural network, a plurality of coefficients that represent the synthetic image after the synthetic image has been encoded using a lossy compression algorithm; and decoding the synthetic image by applying the lossy compression algorithm to the plurality of coefficients.

20 Claims, 7 Drawing Sheets

FIRST SYNTHETIC IMAGE 510

SECOND SYNTHETIC IMAGE 520

THIRD SYNTHETIC IMAGE 530

(52) U.S. Cl.
CPC .............. *G06T 2207/10024* (2013.01); *G06T 2207/20021* (2013.01); *G06T 2207/20052* (2013.01); *G06T 2207/20081* (2013.01); *G06T 2207/20084* (2013.01)

(58) Field of Classification Search
CPC ...... H04N 19/30; H04N 19/44; H04N 19/463; H04N 19/50; H04N 19/513; H04N 19/61; H04N 19/625
See application file for complete search history.

(56) References Cited

U.S. PATENT DOCUMENTS

| | | | |
|---|---|---|---|
| 11,375,242 B1 * | 6/2022 | Said ..................... | H04N 19/119 |
| 2018/0284872 A1 * | 10/2018 | Schluessler ........... | G06F 1/3265 |
| 2019/0130213 A1 | 5/2019 | Shazeer et al. | |

OTHER PUBLICATIONS

Bachlechner et al., "ReZero is All You Need: Fast Convergence at Large Depth," CoRR, Submitted on Mar. 10, 2020, arXiv:2003.04887v1, 11 pages.

Brock et al., "Large Scale GAN Training for High Fidelity Natural Image Synthesis," ICLR 2019, 2019, 35 pages.

Brown et al., "Language Models are Few-Shot Learners," 34th Conference on Neural Information Processing Systems (NeurIPS 2020), 25 pages.

Chen et al., "Generative Pretraining From Pixels," Proceedings of the 37th International Conference on Machine Learning, PMLR 119, 2020, 13 pages.

Child et al., "Generating Long Sequences with Sparse Transformers," CoRR, Submitted on Apr. 23, 2019, arXiv:1904.10509v1, 10 pages.

Choromanski et al., "Rethinking Attention with Performers," ICLR 2021, 2021, 38 pages.

cloud.google.com [online], "Accelerate AI development with Google Cloud TPUs," available on or before May 17, 2017 via Internet Archive: Wayback Machine URL<https://web.archive.org/web/20170517174135/https://cloud.google.com/tpu/>, retrieved on Jul. 26, 2024, retrieved from URL<https://cloud.google.com/tpu/?hl=en>, 9 pages.

data.mendeley.com [online], "A Database of Leaf Images: Practice towards Plant Conservation with Plant Pathology," Jun. 6, 2019, retrieved on Jul. 26, 2024, retrieved from URL< https://data.mendeley.com/datasets/hb74ynkjcn/1>, 4 pages.

De et al., "Batch Normalization Biases Residual Blocks Towards the Identity Function in Deep Networks," Proceedings of the 34th Conference on Neural Information Processing Systems (NeurIPS 2020), 2020, 12 pages.

Dhariwal et al., "Jukebox: A Generative Model for Music," CoRR, Submitted on Apr. 30, 2020, arXiv:2005.00341v1, 20 pages.

Du et al., "Implicit Generation and Modeling with Energy Based Models," Proceedings of the 33rd Conference on Neural Information Processing Systems (NeurIPS 2019), 2019, 11 pages.

GitHub.com [online], "jantic / DeOldify," available on or before Nov. 2, 2018, via Internet Archive: Wayback Machine URL<http://web.archive.org/web/20200106043047/https://github.com/jantic/DeOldify>, retrieved on Jul. 26, 2024, retrieved from URL<https://github.com/jantic/DeOldify>, 18 pages.

Goodfellow et al., "Generative Adversarial Nets," Proceedings of the Conference on Neural Information Processing Systems (NIPS 2014), 9 pages.

Han et al., "not-so-BigGAN: Generating High-Fidelity Images on Small Compute with Wavelet-based Super-Resolution," CoRR, Submitted on Oct. 25, 2020, arXiv:2009.04433v1, 34 pages.

Henighan et al., "Scaling Laws for Autoregressive Generative Modeling," CoRR, Submitted on Oct. 28, 2020, arXiv:2010.14701v1, 35 pages.

Heusel et al., "GANs Trained by a Two Time-Scale Update Rule Converge to a Local Nash Equilibrium," Proceedings of the 31st Conference on Neurla Information Processing Systems (NIPS 2017), 12 pages.

ijg.org [online], "Independent JPEG Group," available on or before Feb. 3, 2020, via Internet Archive: Wayback Machine URL<https://web.archive.org/web/20200203051208/https://ijg.org/>, retrieved on Jul. 25, 2024, retrieved from URL<https://ijg.org/>, 1 page.

International Preliminary Report on Patentability in International Appln. No. PCT/EP2022/052895, Aug. 17, 2023, 10 pages.

International Search Report and Written Opinion in International Appln. No. PCT/EP2022/052895, Jun. 3, 2022, 17 pages.

Johnson et al., "CLEVR: A Diagnostic Dataset for Compositional Language and Elementary Visual Reasoning," 2017 IEEE Conference on Computer Vision and Pattern Recognition (CVPR), 2017, pp. 2901-2910.

kaggle.com [online], "Diabetic Retinopathy Detection," Jul. 2015, retrieved on Jul. 25, 2024, retrieved from URL< https://www.kaggle.com/c/diabetic-retinopathy-detection/data>, 2 pages.

Kaplan et al., "Scaling Laws for Neural Language Models," CoRR, Submitted on Jan. 23, 2020, arXiv:2001.08361v1, 30 pages.

Karras et al., "A Style-Based Generator Architecture for Generative Adversarial Networks," CoRR, Submitted on Dec. 12, 2018, arXiv:1812.04948v1, 12 pages.

Karras et al., "Analyzing and Improving the Image Quality of StyleGAN," 2020 IEEE/CVF Conference on Computer Vision and Pattern Recognition (CVPR), 2020, pp. 8110-8119.

Karras et al., "Progressive Growing of GANs for Improved Quality, Stability, and Variation," ICLR 2018, 2018, 26 pages.

Kersten, "Predictability and redundancy of natural images," J Opt Soc Am A, Dec. 1987, 4(12):2395-2400.

Kingma et al., "Adam: A Method for Stochastic Optimization," CoRR, Submitted on Jul. 20, 2015, arXiv:1412.6980v7, 13 pages.

Kingma et al., "Auto-Encoding Variational Bayes," CoRR, Submitted on Apr. 10, 2014, arXiv:1312.6114v9, 14 pages.

Kingma et al., "Glow: Generative Flow with Invertible 1x1 Convolutions," CoRR, Submitted on Jul. 9, 2018, arXiv:1807.03039v1, 15 pages.

Kitaev et al., "Reformer: The Efficient Transformer," ICLR 2020, 12 pages.

Kuznetsova et al., "The Open Images Dataset V4: Unified image classification, object detection, and visual relationship detection at scal," CoRR, Submitted on Nov. 2, 2018, arXiv:1811.00982v1, 20 pages.

Kynkäänniemi et al., "Improved Precision and Recall Metric for Assessing Generative Models," 33rd Conference on Neural Information Processing Systems (NeurIPS 2019), 2019, 10 pages.

Luo et al., "Deep Wavelet Network with Domain Adaptation for Single Image Demoireing", 2020 IEEE/CVF Conference on Computer Vision and Pattern Recognition Workshops (CVPRW), IEEE, Jun. 14, 2020, pp. 1687-1694.

Mandava et al., "Pay Attention when Required," CoRR, Submitted on Sep. 9, 2020, arXiv:2009.04534v1, 9 pages.

Menick et al., "Generating High Fidelity Images with Subscale Pixel Networks and Multidimensional Upscaling," CoRR, Submitted on Dec. 4, 2018, arXiv:1812.01608v1, 15 pages.

Nash et al., "Generating Images with Sparse Representations," CoRR, Submitted on Mar. 5, 2021, arXiv:2103.03841v1, 18 pages.

nvidia.com [online], "NVIDIA DLSS 2.0: A Big Leap In AI Rendering," Mar. 23, 2020, retrieved on Jul. 26, 2024, retrieved from URL< https://www.nvidia.com/en-gb/geforce/news/nvidia-dlss-2-0-a-big-leap-in-ai-rendering/>, 10 pages.

openai.com [online], "DALL-E: Creating images from text," Jan. 5, 2021, retrieved on Jul. 26, 2024, retrieved from URL< https://openai.com/index/dall-e/>, 13 pages.

Parisotto et al., "Stabilizing Transformers for Reinforcement Learning," Proceedings of the 37th International Conference on Machine Learning, PMLR 119, 2020, 12 pages.

Razavi et al., "Generating Diverse High-Fidelity Images with VQ-VAE-2," 33rd Conference on Information Processing Systems (NeurIPS 2019), 2019, 11 pages.

(56)          References Cited

OTHER PUBLICATIONS

Rezende et al., "Stochastic Backpropagation and Approximate Inference in Deep Generative Models," Proceedings of the 31st International Conference on Machine Learning, 2014, JMLR:W &CP vol. 32, 9 pages.

Rezende et al., "Variational Inference with Normalizing Flows," Proceedings of the 32nd International Conference on Machine Learning, 2015, JMLR: W&CP vol. 37, 9 pages.

Roy et al., "Efficient Content-Based Sparse Attention with Routing Transformers," CORR, Submitted on Mar. 12, 2020, arXiv:2003. 05997v1, 11 pages.

Russakovsky et al., "ImageNet Large Scale Visual Recognition Challenge," CoRR, Submitted on Sep. 1, 2014, arXiv:1409.0575v1, 37 pages.

Shannon, "Prediction and Entropy of Printed English," Bell System Technical Journal, Bell system technical journal, Jan. 1951, 30(1):50-64.

Szegedy et al., "Rethinking the Inception Architecture for Computer Vision," 2016 IEEE Conference on Computer Vision and Pattern Recognition (CVPR), 2016, pp. 2818-2826.

Van den Oord et al., "Neural Discrete Representation Learning," CoRR, Submitted on Nov. 2, 2017, arXiv:1711.00937v1, 10 pages.

Van den Oord et al., "Pixel Recurrent Neural Networks," Proceedings of the 33rd International Conference on Machine Learning, 2016, JMLR:W&CVP vol. 48, 10 pages.

Vaswani et al., "Attention Is All You Need," CoRR, Submitted on Jun. 12, 2017, arXiv:1706.03762v1, 15 pages.

Wallace, "The JPEG still picture compression standard," IEEE Transactions on Consumer Electronics, 1992, 17 pages.

Wang et al., "Image quality assessment: from error visibility to structural similarity," IEEE Transactions on Image Processing, Apr. 2004, vol. 13, No. 4, 14 pages.

Yu et al., "Construction of a Large-scale Image Dataset using Deep Learning with Humans in the Loop," CoRR, Submitted on Jun. 10, 2015, arXiv: 1506.03365v1, 9 pages.

Yu et al., "LSUN: Construction of a Large-scale Image Dataset using Deep Learning with Humans in the Loop," CoRR, Submitted on Jun. 19, 2015, arXiv:1506.03365v2, 9 pages.

Zaheer et al., "Big bird: transformers for longer sequences," Proceedings of the 34th Conference on Neural Information Processing Systems (NeurIPS 2020), Dec. 2020, 15 pages.

Office Action in European Appln. No. 22708041.3, mailed on Oct. 15, 2025, 9 pages.

* cited by examiner

INITIAL IMAGE 102

SYNTHETIC IMAGE
GENERATION
SYSTEM  100

COMPRESSION ENGINE 110

COMPRESSED INITIAL IMAGE
REPRESENTATION 112

NEURAL
NETWORK 120

COMPRESSED
REPRESENTATION OF
SYNTHETIC IMAGE
122

400

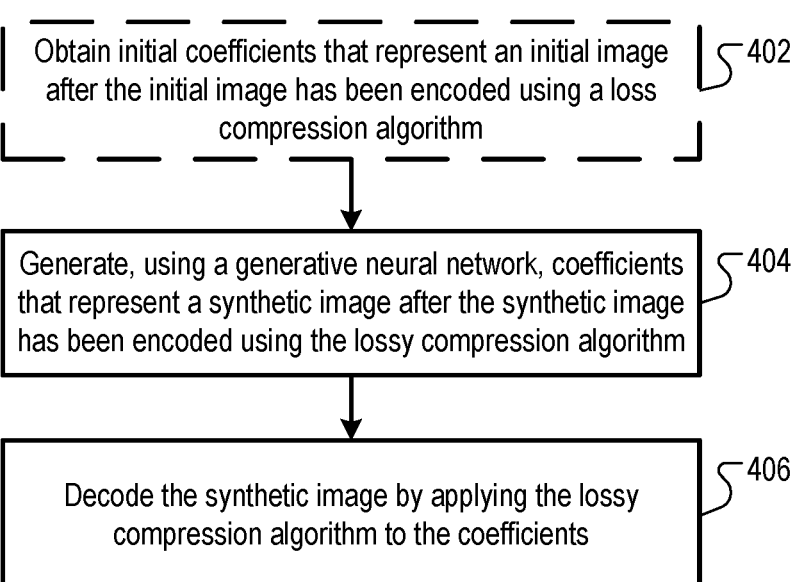

Obtain initial coefficients that represent an initial image after the initial image has been encoded using a loss compression algorithm ⌐402

Generate, using a generative neural network, coefficients that represent a synthetic image after the synthetic image has been encoded using the lossy compression algorithm ⌐404

Decode the synthetic image by applying the lossy compression algorithm to the coefficients ⌐406

FIG. 4

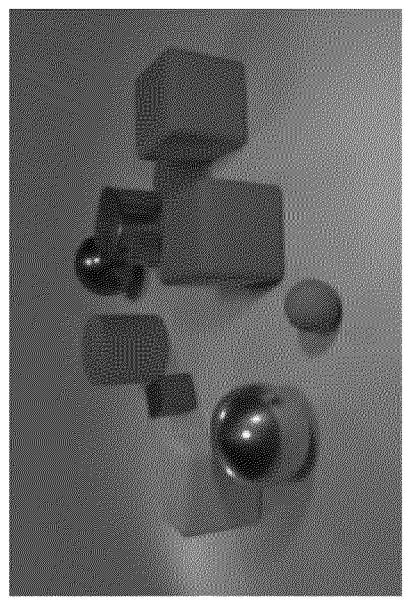
THIRD SYNTHETIC IMAGE 530
SECOND SYNTHETIC IMAGE 520
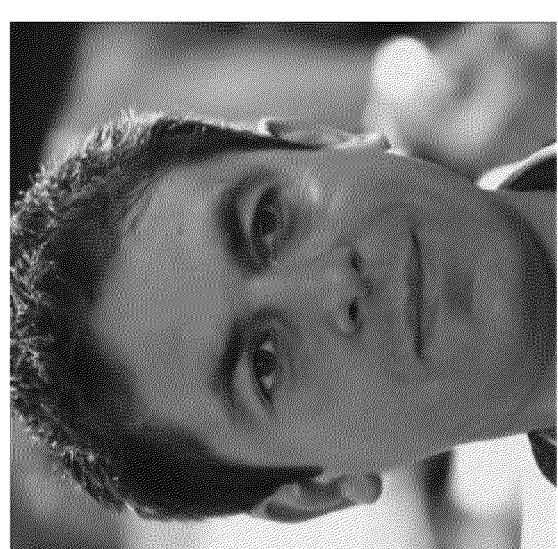
FIRST SYNTHETIC IMAGE 510
FIG. 5

GENERATING IMAGES USING SPARSE REPRESENTATIONS

CROSS-REFERENCE TO RELATED APPLICATIONS

This application is a National Stage Application under 35 U.S.C. § 371 and claims the benefit of International Application No. PCT/EP2022/052895, filed Feb. 7, 2022, which claims the benefit of priority to U.S. Provisional Application Ser. No. 63/146,474, filed Feb. 5, 2021, the entirety of which is incorporated herein by reference.

BACKGROUND

This specification relates to neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that implements a generative neural network that is configured to generate sparse representations of synthetic images. The generative neural network generates data that represents the synthetic image after the image has been encoded using a lossy compression algorithm.

The generative neural network can efficiently generate a synthetic image by generating a sequence of coefficients for a compressed version of the synthetic image, e.g., DCT coefficients that represent the synthetic image after DCT compression is applied to the synthetic image. Each coefficient can identify i) a position in the synthetic image, ii) a coefficient channel (e.g., representing a frequency in DCT compression), and iii) a coefficient channel value. The generative neural network may therefore be considered as operating in the encoding space of a particular lossy compression algorithm.

After the generative neural network has generated the coefficients of the synthetic image, the system can decode the synthetic image by processing the coefficients according to the lossy compression algorithm. That is, the system can recover the synthetic image by processing the coefficients according to the lossy compression algorithm. For example, where DCT coefficients are used, an inverse DCT transform may be performed using the generated coefficients to recover a corresponding image represented by the DCT coefficients.

According to an aspect, there is provided a method of generating a synthetic image using a generative neural network. The method comprises generating, using the generative neural network, a plurality of coefficients that represent the synthetic image after the synthetic image has been encoded using a lossy compression algorithm. The method further comprises decoding the synthetic image by applying the lossy compression algorithm to the plurality of coefficients. The generative neural network may be trained to generate image data in the encoding space of the lossy compression algorithm.

In some implementations, the generative neural network is configured to generate entirely new synthetic images. The generative neural network may be further configured to process a conditioning input identifying desired attributes of the synthetic image for generating the plurality of coefficients that represent the synthetic image. For example, the conditioning input may be a class label that identifies a desired class of the synthetic image. In another example, the conditioning input may be a text input that represents a caption or other sequence of text that describes the synthetic image. In a further example, a random seed may be used. The generative neural network may be configured to generate synthetic images based on images on which the system was trained.

In some other implementations, the generative neural network is configured to generate synthetic images that are an updated or enhanced version of existing images, e.g., by adding color to black-and-white existing images and/or by increasing the resolution of the existing images (super-resolution). Thus, the generative neural network may be configured to perform an image enhancement task. The generative neural network may be configured to process an initial image for generating the plurality of coefficients that represent the synthetic image. The synthetic image may be a higher resolution version of the initial image. The synthetic image may be a colorized version of the initial image. As previously described, the colorization may be a conversion from a black-and-white image to a full color image, or the colorization may have the effect of the application of a particular color filter, such as a sepia filter, the removal of particular color elements, or any other form of color adjustment. In another example, the synthetic image may be a version of the initial image in a different art-style such as a cartoon or fine-art painting. In further examples, the image enhancement may include adjusting the focus or apparent depth of field of the initial image, adjusting the brightness, sharpness, contrast, blur or other image effects. The image enhancement may further comprise repairing an image such as where an image has faded, corrupted or has been damaged in some way. The generative neural network may be configured to perform image compression and the synthetic image may be a compressed version or a lower resolution version of an initial image.

In some implementations, the generative neural network can include a subnetwork that is configured to predict a coefficient channel of a new coefficient. The generative neural network can include a subnetwork that is configured to predict the position in the synthetic image of the new coefficient. The generative neural network can include a subnetwork that is configured to predict the value of the new coefficient. The respective subnetwork outputs may be further processed to generate a likelihood value for each respective channel, position and/or coefficient value. For example, one or more linear neural network layers may be used to generate the likelihood values. A respective channel, position and/or coefficient value may be selected based on the likelihood values, for example, the channel with the highest likelihood value may be selected as the channel for the new coefficient. In other words, a probability distribution over the possible set of selections may be generated based upon the respective subnetwork outputs. The value of the new coefficient may be selected from a discrete set of quantization values according to the lossy compression algorithm. Alternatively, the coefficient values may be continuous values. The range of the continuous values may be limited according to the lossy compression algorithm.

Where the generative neural network includes a plurality of subnetworks, the plurality of subnetworks may be chained such that each subnetwork can receive as input the output of the previous subnetwork. For example, the generative neural network can first generate the coefficient channel of the new coefficient, and then (using the coefficient channel) generate the position of the new coefficient, and then (using the coefficient channel and position) generate the value. More concretely, generating the new coefficient may comprise: processing, using a first subnetwork, a first subnetwork input based upon the plurality of previous coefficients to generate a first subnetwork output that represents the coefficient channel of the new coefficient; processing, using a second subnetwork, a second subnetwork input generated from the first subnetwork output to generate a second subnetwork output that represents the position in the synthetic image of the new coefficient; and processing, using a third subnetwork, a third subnetwork input generated from the second subnetwork output to generate a third subnetwork output that represents the coefficient channel value of the new coefficient. The first subnetwork input may be generated from an embedding of the plurality of previous coefficients. The embedding may be generated using an embedding neural network or may be generated analytically. For example, the coefficients may be aggregated to generate the embedding. The third subnetwork input may be further generated using one or more previously generated coefficients that corresponds to the same position as the new coefficient.

In some implementations, the generative neural network may comprise an encoder subnetwork and/or a decoder subnetwork. The first, second and third subnetworks described above may be part of a decoder subnetwork. The encoder subnetwork may comprise one or more self-attention layers. The decoder subnetwork may comprise i) one or more self-attention layers and ii) one or more encoder-decoder self-attention layers. The encoder and decoder subnetworks may be based upon a Transformer-type neural network architecture. In general a transformer neural network architecture, encoder, or decoder, may be a neural network architecture, encoder, or decoder, characterized by having a succession of self-attention neural network layers. A self-attention neural network layer has an attention layer input for each element of the input and is configured to apply an attention mechanism over the attention layer inputs to generate an attention layer output for each element of the input. There are many different attention mechanisms that may be used.

In some implementations, the synthetic image is segmented into a plurality of blocks of pixels, and wherein each block of pixels is represented by one or more respective coefficients of the plurality of coefficients.

In some implementations, generating the plurality of coefficients comprises, at each of a plurality of time points: obtaining a plurality of previous coefficients generated by the generative neural network at respective previous time points; and processing the plurality of previous coefficients to generate a new coefficient.

In some implementations, each coefficient represents a pixel or a block of pixels and identifies a coefficient channel value corresponding to i) a respective coefficient channel and ii) a respective position in the synthetic image of the pixel or block of pixels; and generating the new coefficient comprises predicting i) the position in the synthetic image of the new coefficient, ii) the coefficient channel of the new coefficient, and iii) the coefficient channel value of the new coefficient. That is, the generative neural network may determine a position in the synthetic image, a channel and a value for the new coefficient. Each coefficient may comprise a tuple of values, for example, an identifier of a coefficient channel, an identifier of a position in the synthetic image and a value of the coefficient.

In some implementations, processing the plurality of previous coefficients to generate the new coefficient comprises: sorting the first plurality of coefficients according to their coefficient channels; and processing the sorted first plurality of coefficients to generate the new coefficient. Thus, the coefficient channels may have a particular ordering based upon a property of the channel. For example, the plurality of coefficients may be sorted according to the spatial frequency represented by the coefficient channel in ascending or descending order. In addition, or alternatively, the coefficient channels have a particular categorization and sorting may comprise grouping together coefficients of the same or similar type.

In some implementations, each coefficient corresponds to one of a plurality of image channels. For example, the image channels may correspond to the color space encoding of the image such as YCbCr or RGB. Sequences of coefficients corresponding to the same respective image channel may be interleaved in intervals in the sorted first plurality of coefficients. For example, a sequence of coefficients may comprise groups of a Y channel coefficient, followed by a Cb channel coefficient, followed by a Cr channel coefficient corresponding to the same spatial frequency with each YCbCr group appearing in sequential order according to spatial frequency.

In some implementations, generating the plurality of coefficients may comprise: obtaining a random seed for the synthetic image; processing the random seed using an encoder subnetwork of the neural network to generate an encoded representation of the random seed. The generation may further comprise: at each of a plurality of time points: obtaining a plurality of previous coefficients generated by the generative neural network at respective previous time points; and processing i) the encoded representation of the random seed and ii) the plurality of previous coefficients using a decoder subnetwork of the generative neural network to generate a new coefficient.

In some implementations, where the synthetic image is to be an updated or enhanced version of an initial image, generating the plurality of coefficients may comprise: obtaining a plurality of initial coefficients that represent the initial image after the initial image has been encoded using the lossy compression algorithm; and processing the plurality of initial coefficients using an encoder subnetwork of the neural network to generate an encoded representation of the plurality of initial coefficients. The generation may further comprise: at each of a plurality of time points: obtaining a plurality of previous coefficients generated by the generative neural network at respective previous time points; and processing i) the encoded representation of the plurality of initial coefficients and ii) the plurality of previous coefficients using a decoder subnetwork of the generative neural network to generate a new coefficient. The plurality of initial coefficients may be re-arranged into a suitable format prior to processing by the encoder subnetwork. For example, where the plurality of coefficients comprises a list of coefficient channel, image position and coefficient value tuples, the plurality of coefficients may be re-arranged as a 3D tensor with the height and width of the image corresponding to the first two dimensions and the channel corresponding to the third dimension. The individual elements of the 3D tensor may then be populated with the corresponding coefficient value at the particular spatial position and channel. Where there is no data for a corresponding spatial position and channel, this may indicate a zero value. The 3D tensor may be provided as input to the encoder subnetwork and may also be flattened beforehand. By arranging the plurality of initial coefficients as a 3D tensor based on the image dimensions, the input to the encoder can be a fixed size whilst the number of initial coefficients may vary. This fixed sized input ensures constant memory and computation independent of the number initial coefficients and enables training on large or variable sequences. In particular, for Transformer-based architectures, the memory requirements of self-attention layers scale quadratically with sequence length. The initial image may be a partially encoded image with portions missing or as discussed above, a lower resolution image or image containing grey-scale only data or partial color data as appropriate to the task.

In some implementations, generating the plurality of coefficients may further comprise: generating a first plurality of coefficients; processing the first plurality of coefficients using an encoder subnetwork of the neural network to generate an encoded representation of the first plurality of coefficients; and at each of a plurality of second time points: obtaining a plurality of previous coefficients generated by the generative neural network at respective previous second time points; and processing i) the encoded representation of the first plurality of coefficients and ii) the plurality of previous coefficients using a decoder subnetwork of the generative neural network to generate a new coefficient. In this way, the encoded representation processed by the decoder subnetwork may be updated to take account of previously generated coefficients (the first plurality of coefficients). The first plurality of coefficients may comprise all coefficients previously generated or a subset of the coefficients previously generated.

In some implementations, the number of the coefficients generated at each time step is fixed. This also helps to ensure constant memory and computation requirements in the generation process.

In some implementations, generating the plurality of coefficients may further comprise: repeatedly performing operations comprising: obtaining all coefficients previously generated by the generative neural network and processing the obtained coefficients using the encoder subnetwork to generate an encoded representation of the obtained coefficients; and using the encoded representation of the obtained coefficients to generate a fixed number of new coefficients.

In some implementations, each coefficient represents a pixel or a block of pixels and identifies a coefficient channel value corresponding to i) a respective coefficient channel and ii) a respective position in the synthetic image of the pixel or block of pixels; and the decoder subnetwork comprises: a first subnetwork configured to predict the coefficient channel of the new coefficient; a second subnetwork configured to predict the position in the synthetic image of the new coefficient; and a third subnetwork configured to predict the coefficient channel value of the new coefficient.

In some implementations, generating the new coefficient comprises: processing a first subnetwork input generated from i) the encoded representation of the first plurality of coefficients and ii) embeddings of the plurality of previous coefficients using the first subnetwork to generate a first subnetwork output that represents the coefficient channel of the new coefficient; processing a second subnetwork input generated from i) the encoded representation of the first plurality of coefficients and ii) the first subnetwork output using the second subnetwork to generate a second subnetwork output that represents the position in the synthetic image of the new coefficient; and processing a third subnetwork input generated from i) the encoded representation of the first plurality of coefficients and ii) the second subnetwork output using the third subnetwork to generate a third subnetwork output that represents the coefficient channel value of the new coefficient.

In some implementations, the third subnetwork input is further generated using each coefficient previously generated by the generative neural network that corresponds to the same position in the synthetic image as the new coefficient.

In some implementations, generating the new coefficient further comprises: processing the first subnetwork output to generate, for each coefficient channel, a likelihood value that the new coefficient corresponds to the coefficient channel; processing the second subnetwork output to generate, for each position in the synthetic image, a likelihood value that the new coefficient is at the position; and processing the third subnetwork output to generate, for each of a plurality of coefficient channel value bands, a likelihood value that the new coefficient has a coefficient channel value in the coefficient channel value band.

In some implementations, each coefficient is a discrete cosine transform (DCT) coefficient that identifies a channel value for a respective DCT channel of a respective block of the synthetic image.

According to another aspect, there is provided a method of training the generative neural network, such as the generative neural network of the above aspect. The training method comprises: obtaining plurality of coefficients that represent a training image after the training image has been encoded using the lossy compression algorithm and determining a first subset of the coefficients. The training method may further comprise: processing the first subset using an encoder subnetwork of the neural network to generate an encoded representation of the first subset. The method may further comprise: at each of a plurality of training time steps: obtaining a plurality of predicted coefficients generated at respective previous training time steps; and processing i) the encoded representation of the first subset and ii) the plurality of predicted coefficients using a decoder subnetwork of the neural network to generate a new predicted coefficient; determining an error of the predicted coefficients using corresponding coefficients of the training image; and updating a plurality of parameters of the generative neural network using the determined error.

As discussed above, the plurality of coefficients may be sorted. For example, the plurality of coefficients may be ordered according to increasing spatial frequency of the coefficient channels. The first subset of the coefficients may correspond to a first subset of spatial frequencies and the target for the predicted coefficients may be a subsequent set of spatial frequencies according to the ordering of spatial frequencies. In this way, the generative neural network may be trained to perform super-resolution, that is, to provide a version of an image at a higher-resolution. That is, by adding higher frequency information to an image, increased detail is provided in the image and the resolution of the image may be increased. In another example, the plurality of coefficients may correspond to a YCbCr color space encoding. The first subset of the coefficients may be coefficients corresponding to the Y (luminance) channel which corresponds to a black-and-white image. The target for the predicted coefficients may be the corresponding Cb and Cr coefficients. In this way, the generative neural network may be trained to perform colorization.

In some implementations, a target subset of the plurality of coefficients of the training image is determined and the first subset of coefficients is determined based upon the target subset. For example, the target subset may be selected at random from the plurality of coefficients and the first subset of coefficients may be a subset of a particular size that precedes the target subset. The first subset and the target subset may however overlap. The target subset may be selected at random based upon a uniform distribution. In another example, the target subset may be selected based upon a likelihood proportional to $l^{-3}$ where l is a position in the sequence of coefficients at which the target subset is to begin. This biases selection towards the beginning of a sequence and where a sequence is ordered by increasing spatial frequency, selects target sequences that contains low frequency information.

In some implementations, the training image may comprise a plurality of image channels and one or more of the image channels may be downsampled prior to encoding using the lossy compression algorithm. For example, Cb and Cr channels may be downsampled by a factor 2 whilst the resolution of the Y channel may be maintained.

According to further aspect, there is provided a method of processing an input sequence using a generative neural network to generate an output sequence having a plurality of output elements. The generative neural network comprises an encoder subnetwork and a sequence of a plurality of decoder subnetworks, the encoder subnetwork comprises one or more self-attention layers, each decoder subnetwork in the sequence of decoder subnetworks comprises i) one or more self-attention layers and ii) one or more encoder-decoder self-attention layers. The method comprises: processing an encoder subnetwork input comprising the input sequence using the encoder subnetwork to generate an embedding of the input sequence; and at each of a plurality of time steps: processing, using the first decoder subnetwork in the sequence of decoder subnetworks, a first decoder subnetwork input generated from i) the embedding of the input sequence and ii) a plurality of output tokens generated at previous time steps to generate a first decoder subnetwork output; for each subsequent decoder subnetwork in the sequence of decoder subnetworks: processing, using the subsequent decoder subnetwork, a subsequent decoder subnetwork input generated from i) the embedding of the input sequence and ii) the decoder subnetwork output generated by the previous decoder subnetwork in the sequence of decoder subnetworks to generate a subsequence decoder subnetwork output; and generating a new output element in the output sequence using the decoder subnetwork outputs.

The input and output can be any type of signal that can be processed using a lossy compression algorithm to generate a compressed representation of the signal. For example, the neural network can be configured to generate a sequence of text, a sequence of audio data, or a sequence of video frames.

According to another aspect, there is provided a system comprising one or more computers and one or more storage devices storing instructions that when executed by the one or more computers cause the one or more computers to perform any of the above method aspects.

According to further aspect, there is provided one or more computer storage media storing instructions that when executed by one or more computers cause the one or more computers to perform any of the above method aspects.

It will be appreciated that features described in the context of one aspect may be combined with features described in the context of another aspect.

The subject matter described in this specification can be implemented in particular embodiments so as to realize one or more of the following advantages.

Some existing techniques for generating synthetic images use an autoregressive neural network to generate each pixel in the synthetic images. For images with hundreds of thousands of pixels or more, the computational cost of generating each pixel can be prohibitive. Using techniques described in this specification, a generative neural network can generate a sparse representation of a synthetic image, significantly reducing the time, memory and computational costs required to generate synthetic images. For example, the generative neural network can generate coefficients representing the most important information in the image, while saving computation by avoiding generating relatively unimportant information, i.e., information that would be lost during compression of the synthetic image.

Using techniques described in this specification, a generative neural network can be trained to generate representations of images that reflect existing compression algorithms, thus leveraging domain knowledge about the most important aspects of an image. The generative neural network therefore does not need to learn an optimal embedding space for the compressed synthetic image, like in some existing systems that must train autoencoders to learn an embedding space for input tensors that encodes as much information from the input tensors as possible. Rather, the generative neural network can leverage an existing embedding space, allowing the system to train the generative neural network directly using easily-obtainable training examples (e.g., images compressed using off-the-shelf compression libraries). Therefore, the system can train the generative neural network in significantly less time and using fewer computational resources.

Using techniques described in this specification, a neural network can generate synthetic images that have a higher precision (e.g., a 5% higher precision), higher recall (e.g., a 64% higher recall), lower Frechet inception distance (FED) (e.g., a 14% lower FED), and/or a lower spatial Frechet inception distance (sFID) (e.g., a 23% lower sFED) than other existing techniques, e.g., when trained using LSUN datasets (arXiv:1506.03365), the FFHQ dataset (arXiv:1812.04948), the class-conditional ImageNet dataset (arXiv:1409.0575), or the OpenImages dataset (arXiv:1811.00982).

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a flow diagram of an example process for generating a compressed representation of a synthetic image.

FIG. 5 is an illustration of example synthetic images generated using a neural network configured to generate compressed representations of synthetic images.

Like reference numbers and designations in the various drawings indicate like elements.

DETAILED DESCRIPTION

This specification describes a system implemented as computer programs on one or more computers in one or more locations that is configured to execute a generative neural network to generate compressed representations of synthetic images.

Figure 1A:
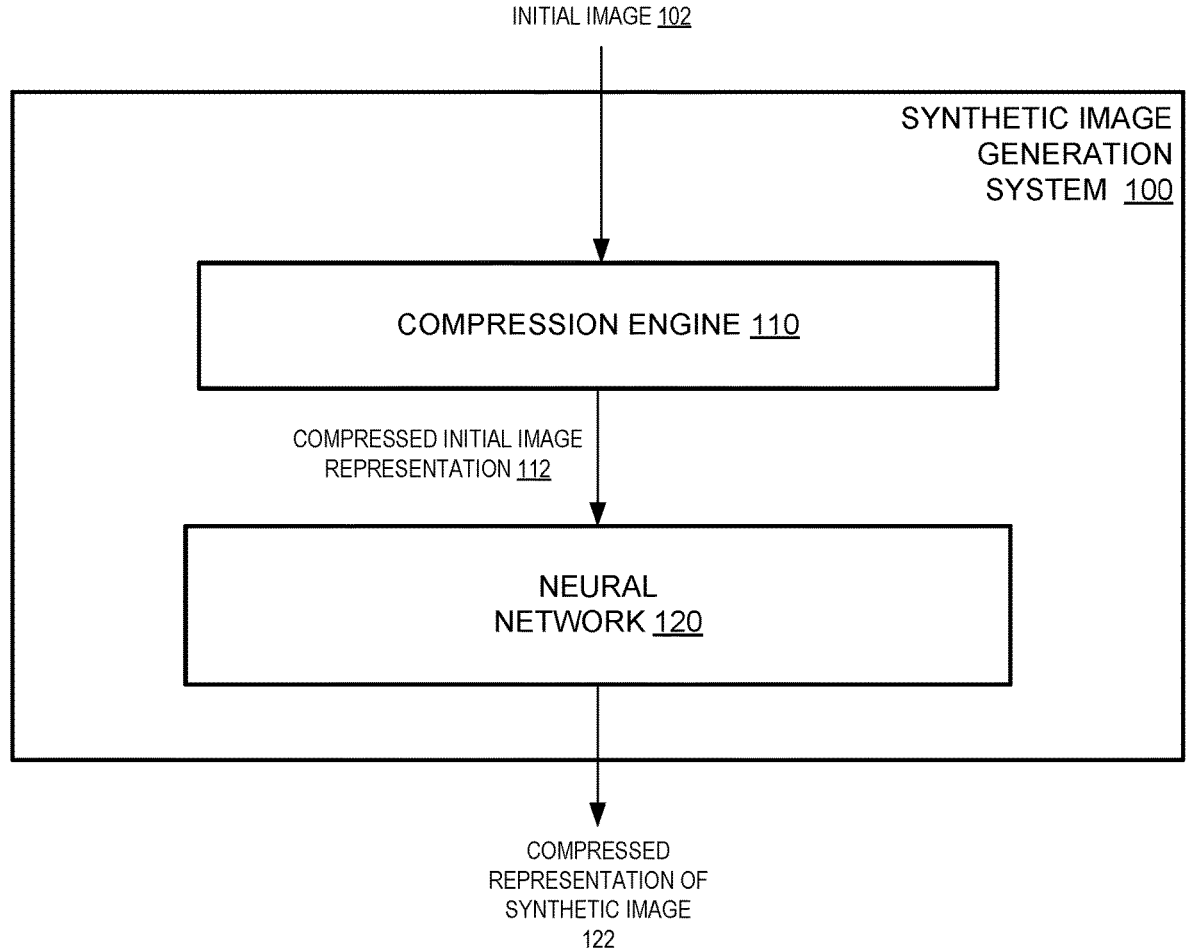
FIG. 1A and FIG. 1B are diagrams of example synthetic image generation systems.

FIG. 1A is a diagram of an example synthetic image generation system 100. The synthetic image generation system 100 is an example of a system implemented as computer programs on one or more computers in one or more locations, in which the systems, components, and techniques described below can be implemented.

The synthetic image generation system 100 is configured to process an initial image 102 (i.e., to process the intensity values of the pixels of the initial image 102) and to generate a compressed representation 122 of a synthetic image that is an updated version of the initial image 102. That is, the synthetic image depicts the same content as the initial image 102, but the synthetic image has been augmented by the synthetic image generation system 100 in some way relative to the initial image 102.

The compressed representation 122 represents the synthetic image after the synthetic image has been compressed using a lossy compression algorithm. In this specification, a compression algorithm is an algorithm for encoding a data object using fewer bits than the original representation of the data object. That is, processing a data object using a compression algorithm includes processing the original representation of the data object to generate an encoded representation of the data object that includes fewer bits than the original representation. A compression algorithm is lossy if the encoded representation of the data object loses some information from the original representation of the data object. In other words, the original representation of the data object is not guaranteed to be perfectly recovered from the encoded representation of the data object.

The synthetic image generation system 100 includes a compression engine 110 and a neural network 120. The compression engine 110 is configured to apply the lossy compression algorithm to the initial image 102 to generate a compressed representation 112 of the initial image.

For example, the lossy compression algorithm can be discrete cosine transform (DCT) compression, which projects an image into a collection of two-dimensional frequencies. For each of multiple B×B blocks of pixels of the image 102, and for each of one or more channels of the image 102, the compression engine 110 can compute:

$$D_{uv} = \frac{1}{4}\alpha(u)\alpha(v) \times \sum_{x=0}^{B-1}\sum_{y=0}^{B-1} P_{xy}\cos\left[\frac{(2x+1)u\pi}{2B}\right]\cos\left[\frac{(2y+1)v\pi}{2B}\right]$$

$$\alpha(u) = \begin{cases} \frac{1}{\sqrt{(2)}}, & \text{if } u = 0 \\ 1, & \text{otherwise} \end{cases},$$

where x and y represent horizontal and vertical pixel components within the block, and u and v index the horizontal and vertical spatial frequencies.

For each pixel block of the image 102 and for each channel of the image 102, DCT compression (before quantization) generates a respective DCT value for each pair of horizontal and vertical frequencies. For clarity, in this specification the pairs of horizontal and vertical frequencies are called "DCT channels," while the original channels of the image 102 are called "image channels." That is, for each pixel block and for each image channel, DCT compression (before quantization) generates a respective DCT value for each DCT channel.

For example, if the image 102 is an RGB image, then for each pixel block in the image 102, the compression engine 110 can generate respective DCT values for each of the red channel, the green channel, and the blue channel of the image. As another example, if the image 102 is a YCbCr image, then for each pixel block in the image 102, the compression engine 110 can generate respective DCT values for each of the Y channel (i.e., the luma channel), the Cb channel (i.e., the blue-difference chroma channel), and the Cr channel (i.e., the red-different chroma channel).

In some implementations, for one or more of the image channels of the image 102, the compression engine 110 downsamples the image channel before performing DCT compression. For example, if the image 102 is a YCbCr image, then the compression engine 110 can downsample (e.g., by a factor of 2) the Cb and Cr channels, while preserving the resolution of the Y channel. Typically, the perceptual cost of downsampling the chroma channels is less than the luma channel; that is, downsampling one or both of the chroma channels can significantly reduce the computational cost of the synthetic image generation system 100, while minimally reducing the quality of the compressed representations 122 of the synthetic images.

As other examples, the compression algorithm can be a wavelet transform algorithm, a discrete sine transform algorithm, a discrete Fourier transform algorithm, or any compression algorithm that represents the images as a set or sequence of coefficients corresponding to respective pixels or pixel blocks of the image. While for convenience this specification often refers to DCT compression, it is to be understood that the techniques described in this specification can be applied using any appropriate compression algorithm.

For each image channel of the initial image 102, after generating the DCT values for each pixel block (or individual pixel) in the initial image 102, the compression engine 110 can quantize the pixel blocks (i.e., quantize the set of DCT values corresponding to each pixel block) to remove frequencies that do not significantly contribute to the full representation of the initial image 102. For example, the compression engine 110 can quantize the pixel blocks by removing higher frequencies that are harder to detect by the human eye than lower frequencies. In some implementations, the compression engine 110 can quantize the pixel blocks by dividing elementwise by a quantization matrix, and rounding to the nearest integer. The quantization matrix can be structured such that higher-frequency components of the pixel blocks are squashed to a larger extent than lower-frequency components.

Thus, using DCT compression, the compressing engine 110 can generate a compressed initial image representation 112 that includes, for each image channel of the initial image 102, a set of coefficients that each include (i) an identification of a position of a pixel block in the initial image 102, (ii) an identification of a DCT channel, and (iii) a DCT value.

The initial image representation 112 can be represented by a sequence of coefficients that includes the respective coefficients for each of the image channels of the initial image 102. The coefficients can be in any appropriate order in the sequence. For example, in some implementations, the sequence includes a first subsequence that includes each of the coefficients corresponding to a first image channel, followed by a second subsequence that includes each of the coefficients corresponding to a second image channel, and so on. In some other implementations, the respective coefficients for the difference image channels are interleaved at intervals in the sequence. The ordering of the coefficients can be predetermined and consistent across all images 102 received by the synthetic image generation system 100, such that when the neural network 102 is trained, the neural network can learn to generate new coefficients in the predetermined order. Training the neural network 120 is described in more detail below with reference to FIG. 3.

In some implementations, each image channel of the initial image 102 can correspond to a respective different and disjoint subset of possible values for the DCT channel of the coefficient. For example, if there are N possible DCT channels (e.g., 64 possible DCT channels for a pixel block size of 8), then a first image channel can correspond to the first N DCT channel values of the coefficients (e.g., values 0 through 63), a second image channel can correspond to the next N DCT channel values of the coefficients (e.g., values 64 through 127), and so on. Thus, given a particular coefficient, which image channel is represented by the coefficient can be directly determined from the DCT channel value of the coefficient. In some other implementations, each coefficient includes a fourth parameter that identifies the image channel represented by the coefficient.

The neural network 120 is configured to process the compressed initial image representation 112 and to generate the compressed representation 122 of the synthetic image. That is, the neural network 130 can be configured to process a network input that includes or represents the compressed initial image representation 112, e.g., a network input that represents some or all of the sequence of coefficients generated by the compression engine 110. In some implementations, as described in more detail below with reference to FIG. 2A, the neural network 120 is configured to further process a conditioning input identifying desired attributes of the synthetic image. The neural network 120 can have any appropriate network architecture for generating the compressed representation 122 of the synthetic image. Example network architectures are discussed in more detail below with reference to FIG. 2A and FIG. 2B.

For example, the synthetic image generation system 100 can be configured process a black-and-white initial image 102 to generate a compressed representation 122 of a synthetic colorized version of the initial image 102. As a particular example, the compressed initial image representation 112 can represent the DCT coefficients for the luma channel of the black-and-white initial image 102, and the neural network 130 can be configured to generate a network output representing respective DCT coefficients for the two chroma channels of a YCbCr synthetic image that is a colorized version of the existing image.

As another example, the synthetic image generation system 100 can be configured to process a low-resolution initial image 102 to generate a compressed representation 122 of a synthetic higher-resolution version of the initial image 102. As a particular example, the compressed initial image representation 112 can represent a sequence of lower-dimensional DCT coefficients generated from the existing image, and the neural network 130 can be configured to augment the sequence to add higher-dimensional DCT coefficients that represent finer detail of content depicted in the existing image.

Although this specification refers to generating sparse representations of images, the techniques described can generally be used to generate sparse representations of outputs that are not images. That is, the neural network 130 can be configured to generate sparse representations of any appropriate type of data. The output can be any type of signal that can be processed using a lossy compression algorithm to generate a compressed representation of the signal. For example, the neural network can 130 be configured to generate a sequence of text, a sequence of audio data, or a sequence of video frames.

Figure 1B:
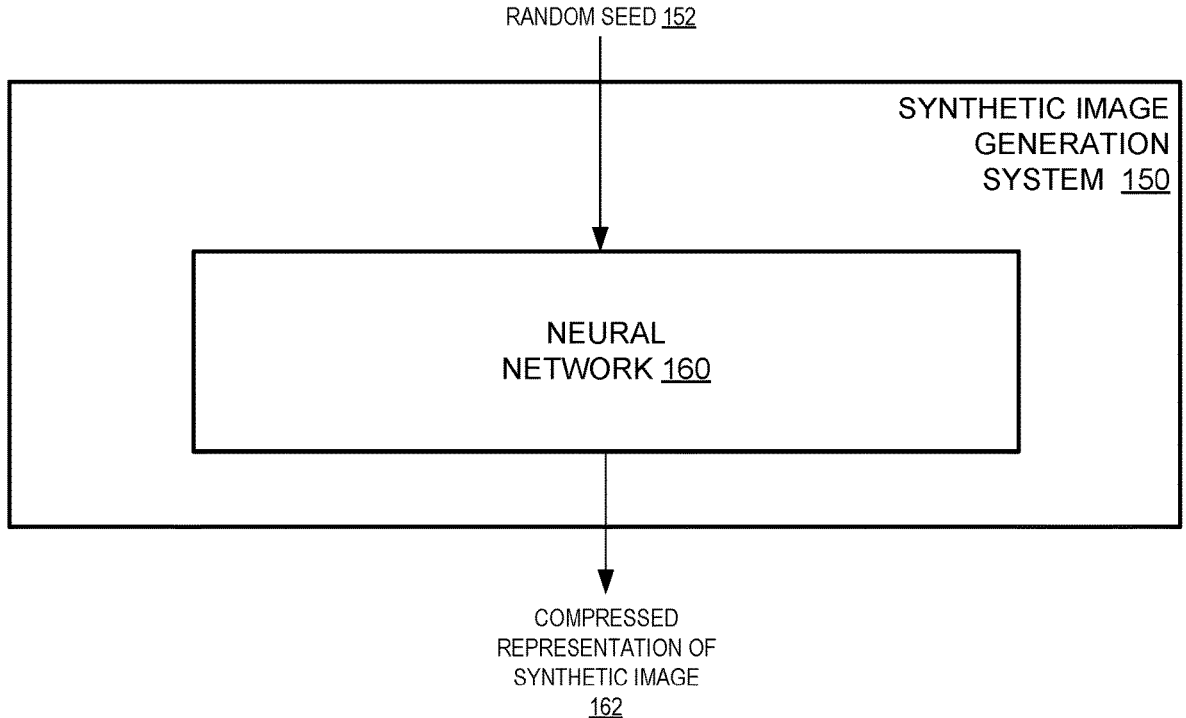

FIG. 1B is a diagram of an example synthetic image generation system 150. The synthetic image generation system 150 is an example of a system implemented as computer programs on one or more computers in one or more locations, in which the systems, components, and techniques described below can be implemented.

The synthetic image generation system 150 is configured to generate a compressed representation 162 of an entirely new synthetic image, i.e., a synthetic image that is not based on an existing image as described above with reference to FIG. 1A.

The synthetic image generation system 150 includes a neural network 160. The neural network 160 is configured to process a random seed 152, e.g., a randomly generated tensor for randomizing the generation of the compressed representation 162 of the synthetic image. The neural network 160 can have any appropriate network architecture for generating the compressed representation 162 of the synthetic image. Example network architectures are discussed in more detail below with reference to FIG. 2A and FIG. 2B.

For example, the neural network 130 can be configured to autoregressively generate a sequence of coefficients of the compressed representation 162.

In some implementations, the neural network 160 also receives as input a conditioning input that identifies desired properties of the synthetic image. For example, the conditioning input can specify requirements for the content of the synthetic image. Examples of conditioning inputs and how a neural network can be configured to incorporate conditioning inputs when generating compressed representations of synthetic images are described in more detail below with reference to FIG. 2A.

Figure 2A:
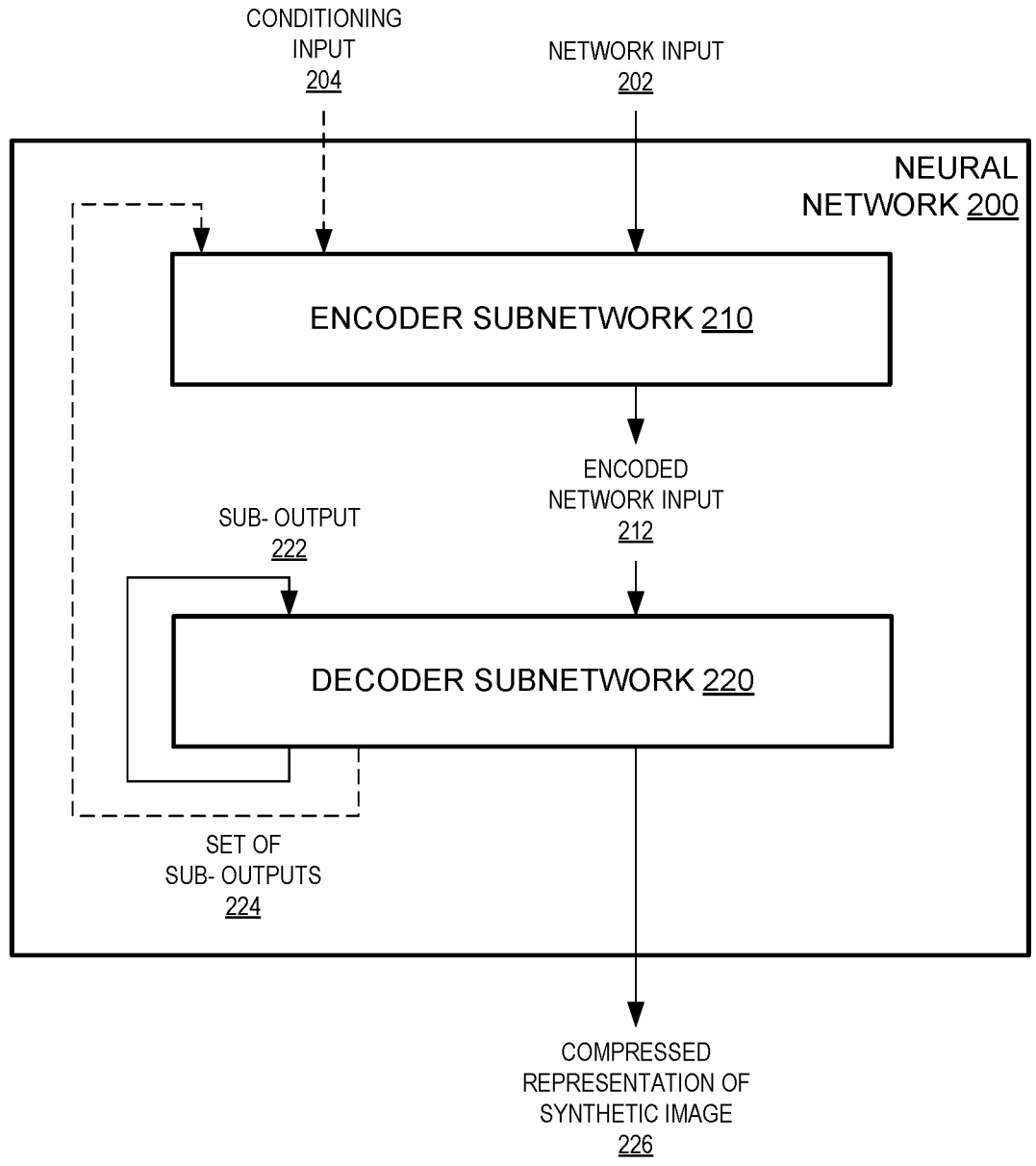
FIG. 2A and FIG. 2B are diagrams of example neural networks configured to generate compressed representations of synthetic images.

FIG. 2A is a diagram of an example neural network 200 that is configured to generate compressed representations 226 of synthetic images. The compressed representations 226 represent the synthetic images after the synthetic images have been process using a compression algorithm.

In some implementations, the neural network 200 is configured to generate compressed representations of entirely new synthetic images. For example, the neural network 200 can be configured similarly to the neural network 160 described above with reference to FIG. 1B. In some other implementations, the neural network 200 is configured to generate compressed representations of synthetic images that are augmented versions of existing images. For example, the neural network 200 can be configured similarly to the neural network 120 described above with reference to FIG. 1A.

The neural network 200 can include an encoder subnetwork 210 and a decoder subnetwork 220.

The encoder subnetwork 210 is configured to process the network input 202 and to generate an encoded network input 212 that is an embedding of the network input 202. In this specification, an embedding is an ordered collection of numeric values that represents an input in a particular embedding space. For example, the embedding can be a vector of floating point or other numeric values that has a fixed dimensionality.

During training of the neural network 200, the network input 202 can be generated from a compressed representation of a training image; this process is described in more detail below with reference to FIG. 3.

In implementations in which the neural network is configured to generate a compressed represented 226 of a synthetic image that is an augmented version of an existing image, the network input 202 represents the existing image after the existing image has been compressed using the compression algorithm. In particular, the network input 202 include or represent a sequence of coefficients that each represent a respective pixel or pixel block of the existing image, as described above.

In some implementations, the encoded network input 212 includes a sequence of embeddings of respective coefficients in the sequence of coefficients represented by the network input 202. For example, the encoder subnetwork 210 can be a self-attention neural network that applies self-attention to the sequence of coefficients of the network input 202 to generate an encoded network input 212 that includes an updated representation of each coefficient in the sequence. In other words, the encoder subnetwork 210 can be a Transformer encoder.

In implementations in which the neural network is configured to generate a compressed representation 226 of a new synthetic image, the network input 202 represents a random seed, e.g., a randomly generated tensor for randomizing the generation of the compressed representation 226 of the synthetic image. In some such implementations, the neural network 200 can save computational resources by not processing the random network input 202 using the encoder subnetwork 210, and instead directly generate a random encoded network input 212.

In some implementations, the neural network 200 also receives as input a conditioning input 204 that identifies desired properties of the synthetic image represented whose compressed representation 226 is to be generated by the neural network 200. For example, the conditioning input 204 can specify requirements for the content of the synthetic image.

For example, the conditioning input 204 can include a class label that identifies a desired class of the synthetic image. As a particular example, the class label can identify a semantic object that should be depicted in the synthetic image, e.g., "dog" or "city." As another particular example, the class label can identify a semantic state of an environment depicted in the synthetic image, e.g., "daytime" or "winter." In some implementations, the neural network 200 appends the class label as a new element of the sequence of coefficients represented by the network input 202 before processing the network input 202. In some other implementations, the neural network 200 concatenates the class label to one or more of the coefficients (e.g., to each of the coefficients) in the sequence represented by the network input 202 before processing the network input 202.

As another example, the conditioning input 204 can include a text input that represents a caption or other sequence of text that describes the synthetic image. The neural network 200 can then process a sequence representing the text input, e.g., using the encoder subnetwork 210 or a different encoder subnetwork of the neural network 200, to generate an embedding of the text input, and combine the embedding of the text input with the encoded network input 212. Instead or in addition, the neural network 200 can combine (e.g., by adding) the embedding of the text input with one or more intermediate outputs of respective neural network layers (e.g., self-attention layers) of the encoder subnetwork 210 and/or the decoder subnetwork 220.

The decoder subnetwork 220 is configured to process the encoded network input 212 and to autoregressively generate sub-outputs 222 that represent new coefficients for the compressed representation 226 of the synthetic image. That is, at a first time step, the decoder subnetwork 220 can process the encoded network input 212 to generate a first sub-output 222 representing a first new coefficient of the compressed representation of the synthetic image. Then, at multiple subsequent time steps, the decoder subnetwork 220 can process (i) respective sub-outputs 222 generated at preceding time steps and, optionally, (ii) the encoded network input 220 to generate respective subsequent sub-outputs 222 representing subsequent new coefficients.

As described above with reference to FIG. 1A, the decoder subnetwork 220 can be configured to generate the sub-outputs 222 representing respective new coefficients in a particular order, e.g., in order of image channel, DCT channel, position, and/or value.

In some implementations, the decoder subnetwork 220 is a self-attention neural network that applies self-attention to the sequence of sub-outputs 222 generated at preceding time steps. In some such implementations, the decoder subnetwork 220 can perform masked self-attention such that subsequent sub-outputs 222 are not used to attend to preceding sub-outputs 222 in the sequence of generated sub-outputs. Instead or in addition, the decoder subnetwork 220 can include one or more cross-attention neural network layers where the encoded network input 212 (which can include respective embeddings of the coefficients represented by the network input 202) are used to attend to the generated sub-outputs 222. In other words, the decoder subnetwork 220 can be a Transformer decoder.

In some implementations, the neural network 200 periodically processes a set 224 of generated sub-outputs 222 using the encoder subnetwork 210 to generate a new encoded network input 212. That is, the decoder subnetwork 220 can use the original encoded network input 212 to generate n sub-outputs 222 representing respective new coefficients; process the n sub-outputs 222 (optionally along with the original network input 202, e.g., by concatenating the new coefficients represented by the sub-outputs 222 to the sequence of coefficients represented by the network input 202) using the encoder subnetwork 210 to generate a new encoded network input 212; and use the new encoded network input 212 to generate another n sub-outputs 222 as described above; and so on.

In some implementations, the decoder subnetwork 220 includes multiple different decoders corresponding to respective components of the coefficients representing the compressed representation 226 of the synthetic image. An example decoder subnetwork with multiple decoders is described in more detail below with reference to FIG. 2B.

The final network output of the neural network 200, i.e., the compressed representation 226, can include each sub-output 222 generated by the decoder subnetwork 220, i.e., each new coefficient in the compressed representation of the synthetic image. In implementations in which the network input 202 itself represents a sequence of coefficients, the compressed representation 226 can include both (i) the coefficients in the network input 202 and (ii) the coefficients generated by the decoder subnetwork 220.

In some implementations, the decoder subnetwork 220 generates a fixed number of sub-outputs 222 before outputting the final compressed representation 226. For example, during training of the neural network 200, the decoder subnetwork 220 can generate the same number of sub-outputs 222 as there are coefficients in a target output. Example techniques for training the neural network 200 are described in more detail below with reference to FIG. 3. In some other implementations, the decoder subnetwork 220 is configured to generate a sub-output 222 that is a "stopping token" to indicate that the synthetic image is completed.

Figure 2B:
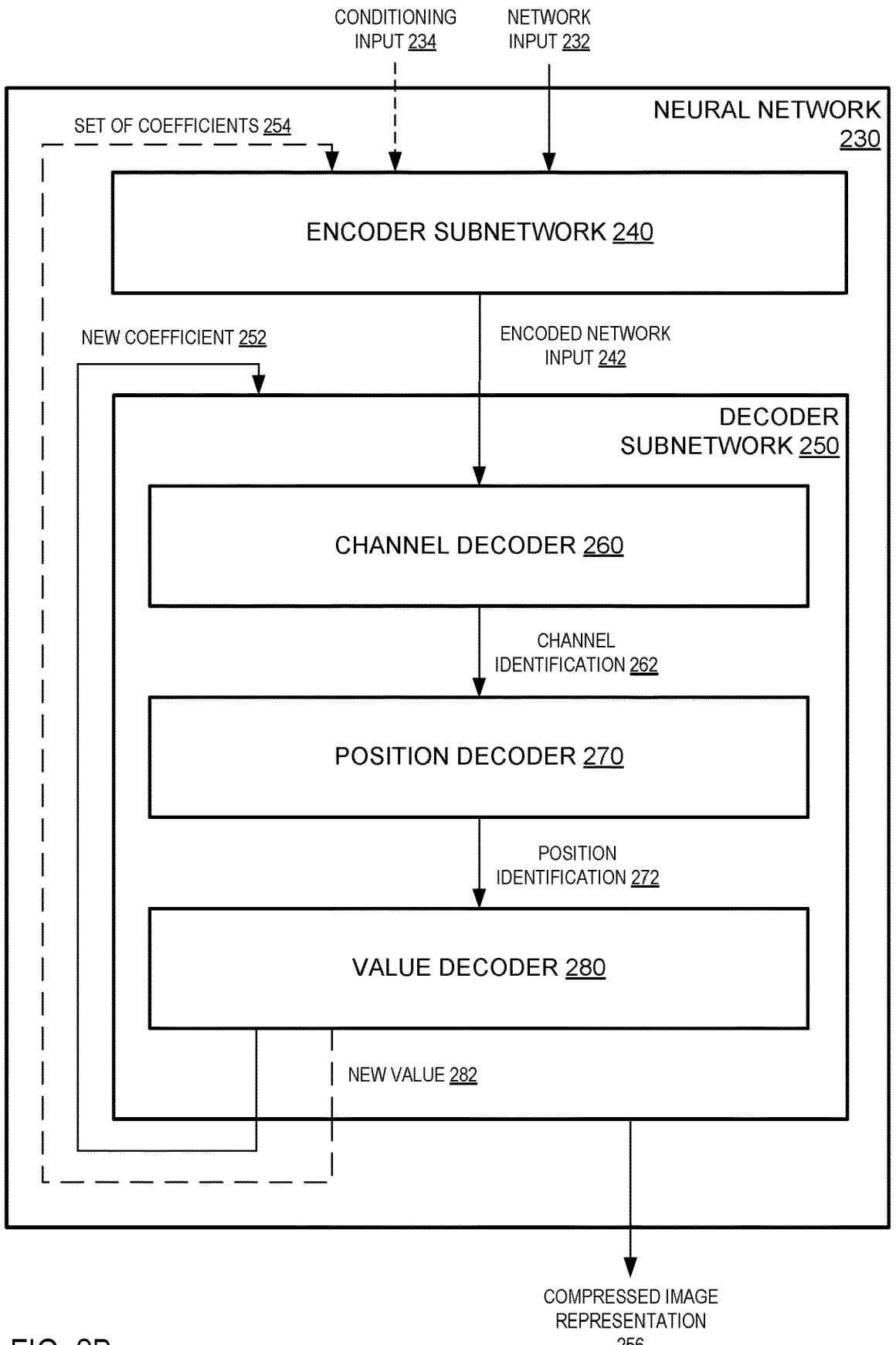

FIG. 2B is a diagram of an example neural network 230 that is configured to generate compressed representations 256 of synthetic images. The compressed representations 256 represent the synthetic images after the synthetic images have been processed using a compression algorithm.

In some implementations, the neural network 230 is configured to generate compressed representations of entirely new synthetic images. For example, the neural network 230 can be configured similarly to the neural network 160 described above with reference to FIG. 1B. In some other implementations, the neural network 230 is configured to generate compressed representations of synthetic images that are augmented versions of existing images. For example, the neural network 230 can be configured similarly to the neural network 120 described above with reference to FIG. 1A.

The neural network 230 is configured to receive as input (i) a network input 232 and, optionally, (ii) a conditioning input 234.

During training of the neural network 230, the network input 232 can be generated from a compressed representation of a training image; this process is described in more detail below with reference to FIG. 3.

In some implementations, the neural network 230 is configured to generate compressed representations 256 of synthetic images from scratch. In these implementations, after the neural network 230 has been trained, the network input 232 can represent a random seed, e.g., a randomly generated tensor for randomizing the generation of the compressed representation 256 of the synthetic image.

In some other implementations, the neural network 230 is configured to generate compressed representations 256 of synthetic images that are colorized versions of respective existing black-and-white images. In these implementations, the network input 232 can include a sequence of coefficients representing a compressed representation of the existing black-and-white image.

In some other implementations, the neural network 230 is configured to generate compressed representations 256 of synthetic images that are higher-resolution versions of respective existing images. In these implementations, the network input 232 can include a sequence of coefficients representing a compressed representation of the existing image.

The encoder subnetwork 240 is configured to process the network input 232 and to generate an encoded network input 242 that is an embedding of the network input 232. In implementations in which the network input 232 includes a sequence of coefficients of a compressed representation of an image, the encoded network input 242 can include respective embeddings of each of the coefficients.

As described above with reference to FIG. 2A, the conditioning input 234 can identify one or more desired attributes of the synthetic image whose compressed representation 256 is to be generated by the neural network 230. In these implementations, the encoder subnetwork 240 can combine the conditioning input 234 and the network input 232 (or embeddings thereof) as described above with reference to FIG. 2A.

In some implementations in which the network input 232 is randomly-generated, the neural network 230 can save computational resources by not processing the random network input 232 using the encoder subnetwork 240, and instead directly generate a random encoded network input 242.

The decoder subnetwork 250 is configured to process the encoded network input 242 and autoregressively generate new coefficients 252 for the compressed representation 256 of the synthetic image. That is, at a first time step, the decoder subnetwork 250 can process the encoded network input 242 to generate a first new coefficient 252 of the compressed representation of the synthetic image. Then, at multiple subsequent time steps, the decoder subnetwork 250 can process (i) respective coefficients 252 generated at preceding time steps and, optionally, (ii) the encoded network input 242 to generate respective subsequent new coefficients 252.

The decoder subnetwork 250 includes three decoders that are each subnetworks configured to generate elements of the new coefficients 252: a channel decoder 260 configured to generate an identification of a channel 262 of the new coefficient 252, a position decoder 270 configured to generate an identification of a position 272 of the new coefficient 252, and a value decoder 280 configured to generate the value 282 of the new coefficient 252.

At each time step, the channel decoder 260 is configured to process (i) the encoded network input 242 and, after the first time step, (ii) one or more previously-generated coefficients 252 to generate the identification of the channel 262 of the new coefficient 252. In implementations in which the compressed image representation 256 has a format defined by DCT compression, the channel 262 is a DCT channel. That is, generally the channel 262 does not represent an identification of an image channel, but rather a coefficient channel defined by the compression algorithm according to which the neural network 230 is configured to generate compressed image representations 256.

For example, the channel decoder 260 can be a Transformer decoder that applies masked self-attention to the sequence of previously-generated coefficients 252 and cross-attention between the previously-generated coefficients 252 and the encoded network input 242. As a particular example, the channel decoder 260 can compute a hidden state $H_{channel}$, as:

$$E_{channel} = C_{1:S-1} + P_{1:S-1} + V_{1:S-1} + P_{chunk}$$

$$H_{channel} = \text{decode}_{channel}(E_{channel}; E_{input}).$$

where $C_{1:S-1}$ represents the channels 262 of the previously-generated coefficients 222; $P_{1:S-1}$ represents the positions 272 of the previously-generated coefficients 252; and $V_{1:S-1}$ represents the values 282 of the previously-generated coefficients 252. $P_{chunk}$ represents, for each previously-generated coefficient 252, a position within a "chunk" (i.e., subsequence) of the coefficients 252, e.g., identifying a position of the coefficient among all coefficients generated so far by the decoder subnetwork 250 (or a position of the coefficient among the coefficients generated in response to processing a particular encoded network input 242 generated by the encoder subnetwork 240; as described above with reference to FIG. 2A, in some implementations, the encoder subnetwork 240 can iteratively generate multiple different encoded network inputs 242 during the execution of the neural network 230). The function decode$_{channel}$ represents the sequence of neural network layers of the channel decoder 260, where the neural network layers apply masked self-attention to the input listed first (i.e., E$_{channel}$) and cross-attention to the input listed second (i.e., E$_{input}$).

The hidden state H$_{channel}$ can then be processed, e.g., using one or more feedforward neural network layers, to determine the identification of the channel 262. As a particular example, the channel decoder 260 can process the hidden state H$_{channel}$ using one or more neural network layers to generate, for each possible channel, a likelihood value that the new coefficient 252 corresponds to the channel, and identify the channel 262 with the highest likelihood.

At each time step, the position decoder 270 is configured to process an input generated from (i) the identification of the channel 262 generated by the channel decoder 260, (ii) the one or more previously-generated coefficients 252, and, optionally, (iii) the encoded network input 242 to generate the identification of the position 272 of the new coefficient 252. The position 272 identifies which block of pixels in the synthetic image the new coefficient 252 will represent, from a predetermined set of pixel blocks as described above.

For example, the position decoder 270 can be a Transformer decoder that combines the identification of the channel 252 generated by the channel decoder 260 (or an intermediate representation generated by the channel decoder 260, e.g., H$_{channel}$) with the sequence of previously-generated coefficients 252, and (i) applies masked self-attention to the combination, and (ii) applies cross-attention between the combination and the encoded network input 242. As a particular example, the position decoder 270 can compute a hidden state H$_{position}$, as:

$$E_{position} = H_{channel} + C_{2:S}$$

$$H_{position} = \text{decode}_{position}(E_{position}; E_{input})$$

where C$_{2:S}$ is generated by concatenating the identification of the channel 262 to the identifications of the channels of the previously-generated coefficients 252. The function decode$_{position}$ represents the sequence of neural network layers of the position decoder 270, where the neural network layers apply masked self-attention to the input listed first (i.e., E$_{position}$) and cross-attention to the input listed second (i.e., E$_{input}$).

The hidden state H$_{position}$ can then be processed, e.g., using one or more feedforward neural network layers, to determine the identification of the position 272. As a particular example, the position decoder 270 can process the hidden state H$_{position}$ using one or more neural network layers to generate, for each possible position in the synthetic image, a likelihood value that the new coefficient 252 corresponds to the position, and identify the position 272 with the highest likelihood.

At each time step, the value decoder 280 is configured to process an input generated from (i) the identification of the channel 262 generated by the channel decoder 260, (ii) the identification of the position 272 generated by the position decoder 270, (iii) the one or more previously-generated coefficients 252, and, optionally, (iv) the encoded network input 242 to generate the value 282 of the new coefficient 252.

For example, the value decoder 280 can be a Transformer decoder that combines the identification of the position 272 generated by the position decoder 270 (or an intermediate representation generated by the position decoder 270, e.g., H$_{position}$) with the values of the previously-generated coefficients 252 in the same position 272 in the synthetic image, and (i) applies masked self-attention to the combination, and (ii) applies cross-attention between the combination and the encoded network input 242. As a particular example, the value decoder 250 can compute a hidden state H$_{value}$, as:

$$E_{value} = H_{position} + \text{gather}(E_{inputs}, P_{2:S})$$

$$H_{value} = \text{decode}_{value}(E_{value}; E_{input})$$

where P$_{2:S}$ is generated by concatenating the identification of the position 272 to the identifications of the positions of the previously-generated coefficients 252, and the function "gather" options, for each position in P$_{2:S}$, the respective embedding in the encoded network input 242 corresponding to the same position, thus allowing the value decoder 280 to access the other values 282 at the position at which the value decoder 280 is to make a prediction. That is, the function "gather" obtains (i) for each of the previously-generated coefficients 252, the embedding in the encoded network input 242 corresponding to the same spatial position as the coefficient and (ii) the embedding in the encoded network input 242 corresponding to the same spatial position as the position 272 generated by the position decoder 270.

The function decode$_{value}$ represents the sequence of neural network layers of the value decoder 280, where the neural network layers apply masked self-attention to the input listed first (i.e., E$_{value}$) and cross-attention to the input listed second (i.e., E$_{input}$).

The hidden state H$_{value}$ can then be processed, e.g., using one or more feedforward neural network layers, to determine the new value 282.

In some implementations, the neural network 230 periodically processes a set 254 of coefficients 252 generated by the decoder subnetwork 250 using the encoder subnetwork 240 to generate new encoded network input 242, and then uses the new encoded network input 242 to generate additional new coefficients 252, as described above with reference to FIG. 2A.

Although as depicted in FIG. 2B the value decoder 280 follows the position decoder 270 which follows the channel decoder 260, generally the three decoders can be in any order. In some other implementations, two or more of the decoders 260, 270, or 280 can execute in parallel, i.e., can take inputs that do not require the completion of one or both of the other decoders.

Figure 3:
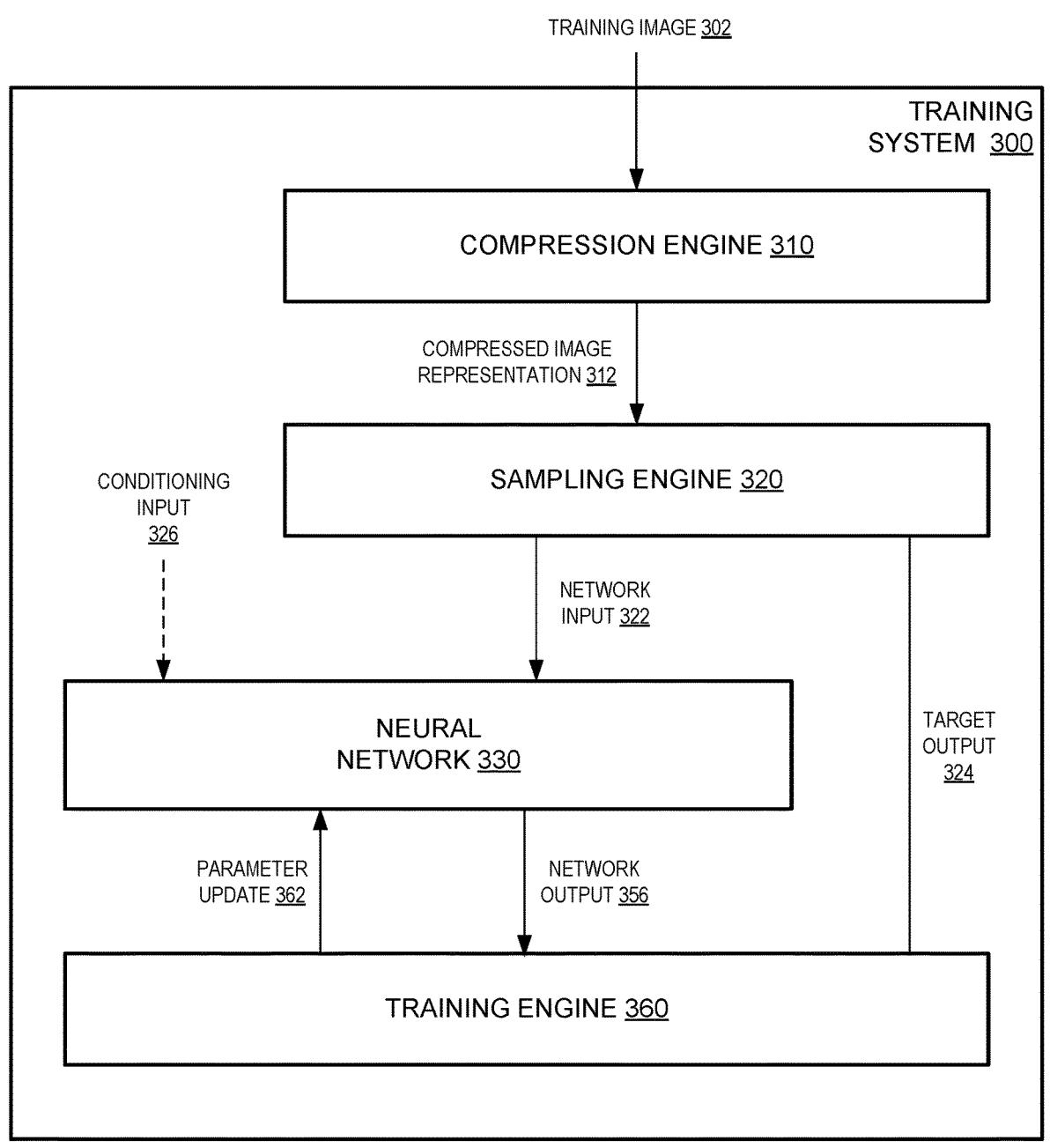
FIG. 3 is a diagram of an example training system.

FIG. 3 is a diagram of an example training system 300. The training system 300 is an example of a system implemented as computer programs on one or more computers in one or more locations, in which the systems, components, and techniques described below can be implemented.

The training system 300 is configured to train a neural network 330 to generate compressed representations of synthetic images. That is, the training system 300 trains the neural network 330 to generate data representing the synthetic images after the synthetic images have been compressed using a compression algorithm. The compressed representations generated by the neural network 330 can then be decoded according to the compression algorithm to recover the synthetic images. As described above with reference to FIG. 1A, the compression algorithm can be a lossy compression algorithm, i.e., where only an approximation of the synthetic images can be recovered from the compressed representations generated by the neural network 330.

The lossy compression algorithm is pre-configured before the training system 300 trains the neural network 330, such that the neural network 330 is trained to generate outputs that match the lossy compression algorithm. In other words, the lossy compression algorithm is not learned jointly with the training of the neural network 330, but rather the neural network 330 is trained to generate outputs whose format is defined by the pre-configured lossy compression algorithm.

The training system 300 is configured to train the neural network 330 using a training image 302. Typically the training system 300 repeats the process described below using multiple different training images 302 during training of the neural network 330 (i.e., generating multiple parameter updates 362 for the parameters of the neural network 330 using respective training images 302 or batches of training images 302).

The training system 300 includes a compression engine 310, a sampling engine 320, the neural network 330, and a training engine 360.

The compression engine 310 is configured to process the training image 302 using the compression algorithm to generate a compressed representation 312 of the training image 302. The compressed image representation 312 can include a set of coefficients that each define parameters of a respective pixel or pixel block of the training image 302. Each coefficient can identify (i) a position in the synthetic image represented by the coefficient, (ii) a coefficient channel of the compressed representation of the synthetic image represented by the coefficient, and (iii) a value for the coefficient. Optionally, each coefficient can further identify a corresponding image channel; in some other implementations, the image channel is implied by the value of the coefficient channel, as described above with reference to FIG. 1A. The coefficients can be arranged in a sequence in any appropriate order in the compressed representation 312.

The loss compression algorithm can be any appropriate compression algorithm for generating compressed representations 312 of images 302. For example, the compression engine 310 can use any compression algorithm described above with reference to FIG. 1A, e.g., DCT compression. Although for convenience the below description refers to DCT compression, it is to be understood that generally the training system 300 can train the neural network 330 to generate compressed representations of synthetic images according to any appropriate compression algorithm.

As described above with reference to FIG. 1A, in some implementations, for one or more of the image channels of the training image 302, the compression engine 310 downsamples the image channel before performing compression. For example, if the training image 302 is a YCbCr image, then the compression engine 310 can downsample (e.g., by a factor of 2) the Cb and Cr channels, while preserving the resolution of the Y channel.

As described above with reference to FIG. 1A, for each image channel of the training image 302, after generating the DCT values for each pixel block (or individual pixel) in the training image 302, the compression engine 310 can quantize the pixel blocks (i.e., quantize the set of DCT values corresponding to each pixel block) to remove frequencies that do not significantly contribute to the full representation of the training image 302.

Thus, using DCT compression, the compressing engine 310 can generate a compressed image representation 312 that includes, for each image channel of the training image 302, a set of coefficients that each include (i) an identification of a position of a pixel block in the training image 302, (ii) an identification of a DCT channel, and (iii) a DCT value.

The sampling engine 320 is configured to generate, from the compressed representation 312 of the training image 302, a network input 322 for the neural network 330 and a target output 324 that represents a network output 356 that should be generated by the neural network 330 in response to processing the network input 322.

The target output 324 represents a first subsequence of the sequence of coefficients represented by the compressed image representation 312. Through training the neural network 330 to generate network outputs 356 that match target outputs 324 representing different subsequences of different compressed image representations 312, training system 300 can train the neural network 330 to generate the entire sequence of coefficients for a compressed representation of a new synthetic image (or, in an implementation in which the neural network 330 is configured to colorize existing images or increase the resolution of existing images as described below, augment the sequence of coefficients for the compressed representations of the existing images).

The network input 322 represents a second subsequence of the sequence of coefficients represented by the compressed image representation 312, where the second subsequence precedes the first sequence in the compressed image representation. For example, the second subsequence can include each coefficient that precedes the first subsequence in the sequence of coefficients represented by the compressed image representation 312. As another example, the second subsequence can include a fixed number of coefficients that directly precede the first subsequence in the sequence of coefficients represented by the compressed image representation 312.

In some implementations, the sampling engine 320 samples the target output 324 uniformly from the sequence of coefficients in the compressed image representation 312. In some other implementations, the sampling engine 320 biases the selection of the subsequence for the target output 324 towards the beginning of the sequence of coefficients in the compressed image representation 312, which contains more low-frequency information and thus has a higher influence on the quality of the synthetic image. As a particular example, the sampling engine 320 can sample a coefficient at position l in the sequence of coefficients to be the beginning of the target output 324 with likelihood proportional to $l^{-3}$, e.g., down to a minimum likelihood.

In some implementations, there is an overlap of the coefficients in the target output 324 and the network input 322; this overlap can help the neural network 330 when generating the first few coefficients (i.e., the coefficients in the overlap).

The training system 300 trains the neural network 330 to generate a network output 356 that matches the target output 324 in response to processing the network input 322. That is, the training system 300 trains the neural network 330 to generate the first subsequence of coefficients in response to processing the preceding second subsequence of coefficients representing the compressed image representation 312.

In some implementations, the neural network 330 is configured to generate compressed representations of synthetic images from scratch, i.e., compressed representations of entirely new synthetic images. For example, the neural network 330 can be configured to autoregressively generate the sequence of coefficients of the compressed representations. Thus, the training system 300 can train the neural network to generate the compressed representations of the new synthetic images by training the neural network 330 to generate, for multiple different sequences of coefficients representing respective different training images 302, a respective first subsequence of coefficients in response to processing a preceding second subsequence of coefficients.

In some other implementations, the neural network 330 is configured to generate a compressed representation of a synthetic image that is an augmentation of an existing image. In these implementations, the neural network 330 can be configured to process a network input 322 that represents the existing image, e.g., a network input 322 that represents some or all of the sequence of coefficients representing a compressed representation of the existing image as described above.

The neural network 330 can have any appropriate network architecture for generating the network output 356 representing the compressed representation of the synthetic image from the network input 322. For example, the neural network 330 can be configured similarly to the neural network 200 described above with reference to FIG. 2A or the neural network 230 described above with reference to FIG. 2B.

In some implementations, as described above with reference to FIG. 1A, the neural network 330 also receives as input a conditioning input 326 that identifies desired properties of the synthetic image represented by the network output 356.

After the neural network 330 generates the network output 356 that includes the coefficients for the compressed representation of the synthetic image, the neural network 330 can provide the network output 356 to the training engine 360.

The training engine 360 is configured to determine an error between (i) the network output 356 representing the coefficients generated by the neural network 330 and (ii) the target output 324 representing the "true" coefficients of the compressed representation 312 of the training image 302. The training engine 360 can then generate a parameter update 362 for a set of learnable parameters of the neural network 330 (e.g., the network parameters of the encoder subnetwork 340 and the decoder subnetwork 350) using the determined error. For example, the determined error can be the cross-entropy error.

The training system 300 can repeat the above process for multiple different training images 302 until the neural network 330 is trained, e.g., until a performance of the neural network 330 (e.g., as measured by prediction accuracy) reaches a predetermined threshold, until a marginal improvement to the performance of the neural network 330 falls below a predetermined threshold, until a threshold number of training iterations have been performed, or until a threshold amount of time has elapsed. The parameter update 362 may be determined based upon stochastic gradient descent or other appropriate technique for training neural networks.

After training, the neural network 330 can be deployed in an inference environment, e.g., to generate new synthetic images, colorize existing black-and-white images, and/or to increase the resolution of existing low-resolution images. For instance, after training, the neural network 330 can be deployed in the synthetic image augmentation system 100 described above with reference to FIG. 1A and/or the synthetic image generation system 150 described above with reference to FIG. 1B.

FIG. 4 is a flow diagram of an example process 400 for generating a compressed representation of a synthetic image. For convenience, the process 400 will be described as being performed by a system of one or more computers located in one or more locations. For example, a synthetic image generation system, e.g., the synthetic image generation system 100 depicted in FIG. 1A or the synthetic image generation system 150 depicted in FIG. 1B, appropriately programmed in accordance with this specification, can perform the process 400.

Optionally, the system obtains initial coefficients that represent an initial image after the initial image has been encoded using a lossy compression algorithm (step 402).

The system generates, using a generative neural network, coefficients that represent a synthetic image after the synthetic image has been encoded using the lossy compression algorithm (step 404).

For example, the synthetic image can be segments into multiple blocks of pixels, and each block of pixels can be represented by one or more of the generated coefficients. As a particular example, each coefficient can be a discrete cosine transform (DCT) coefficient that identifies a channel value for a respective DCT channel of a respective block of the synthetic image.

In some implementations, the generative neural network is an autoregressive neural network that, at each of multiple time points, (i) obtains previous coefficients generated by the generative neural network at respective previous time points and (ii) processes the previous coefficients to generate a new coefficient for the current time point.

In some implementations, the generative neural network generates the coefficients for the synthetic image from scratch; that is, the system does not perform step 402. In these implementations, the system can obtain a random seed for the synthetic image; process the random seed using an encoder subnetwork of the generative neural network to generate an encoded representation of the random seed; and, at each of multiple time points: obtain previous coefficients generated by the generative neural network at respective previous time points; and process i) the encoded representation of the random seed and ii) the previous coefficients using a decoder subnetwork of the generative neural network to generate a new coefficient.

In some other implementations, the system does perform step 402, and the synthetic image is an updated version of the initial image. In these implementations, the system can process the initial coefficients using an encoder subnetwork of the neural network to generate an encoded representation of the initial coefficients; and, at each of a plurality of time points: obtain previous coefficients generated by the generative neural network at respective previous time points; and process i) the encoded representation of the initial coefficients and ii) the plurality of previous coefficients using a decoder subnetwork of the generative neural network to generate a new coefficient.

As particular examples, the synthetic image can be a colorized version of the initial image; or a higher-resolution version of the initial image.

The system decodes the synthetic image by applying the lossy compression algorithm to the coefficients generated in step 404 (step 406). The system can provide the decoded synthetic image to any appropriate external system, e.g., for storage or further processing.

FIG. 5 is an illustration of example synthetic images 510, 520, and 530 generated using a neural network configured to generate compressed representations of synthetic images.

For example, the synthetic images 510, 520, and 530 can have been generated using the neural network 120 of the synthetic image generation system 100 described above with reference to FIG. 1A, the neural network 160 of the synthetic image generation system 150 described above with reference to FIG. 1B, the neural network 200 described above with reference to FIG. 2A, or the neural network 230 described above with reference to FIG. 2B.

In particular, the synthetic images 510, 520, and 530 are decoded versions of respective compressed representations of the synthetic images 510, 520, and 530 generated by the neural network. The neural network can be configured to generate a set of coefficients of the compressed representations, e.g., by autoregressively generating outputs representing respective coefficients, as described above.

In some implementations, one or more of the synthetic images 510, 520, and 530 are augmented versions of respective original images. For example, the second synthetic image 520, depicting a mushroom, can have been generated by processing a low-resolution version of the synthetic image 520, e.g., a low-resolution image of a real-life mushroom.

In some implementations, one or more of the synthetic images 510, 520, and 530 are entirely new, i.e., have not been generated based on respective existing images. For example, the first synthetic image 510, depicting a person, can have been generated from a random seed.

In some implementations, one or more of the synthetic images 510, 520, and 530 have been generated from respective conditioning inputs that identify desired properties of the synthetic images 510, 520, and 530. For example, the third synthetic image 530, depicting a set of reflective and matte geometric objects, can have been generated from a conditioning input, e.g., that identifies a number or configuration of the objects.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method of processing an input sequence using a generative neural network to generate an output sequence having a plurality of output elements, wherein:

the generative neural network comprises an encoder subnetwork and a sequence of a plurality of decoder subnetworks, the encoder subnetwork comprises one or more self-attention layers, each decoder subnetwork in the sequence of decoder subnetworks comprises i) one or more self-attention layers and ii) one or more encoder-decoder self-attention layers, the method comprising:

processing an encoder subnetwork input comprising the input sequence using the encoder subnetwork to generate an embedding of the input sequence; and at each of a plurality of time steps:

processing, using the first decoder subnetwork in the sequence of decoder subnetworks, a first decoder subnetwork input generated from i) the embedding of the input sequence and ii) a plurality of output tokens generated at previous time steps to generate a first decoder subnetwork output;

for each subsequent decoder subnetwork in the sequence of decoder subnetworks:

processing, using the subsequent decoder subnetwork, a subsequent decoder subnetwork input generated from i) the embedding of the input sequence and ii) the decoder subnetwork output generated by the previous decoder subnetwork in the sequence of decoder subnetworks to generate a subsequent decoder subnetwork output; and generating a new output element in the output sequence using the decoder subnetwork outputs.

2. The method of claim 1, wherein the output elements in the output sequence represent an output image.

3. The method of claim 2, further comprising:

generating the output image from the output elements in the output sequence.

4. The method of claim 3, wherein the output elements in the output sequence specify a plurality of coefficients of a lossy compression algorithm; and wherein generating the output image comprises decoding the output image by applying the lossy compression algorithm to the plurality of coefficients.

5. The method of claim 3, wherein each output element represents a respective coefficient, and:

the first decoder subnetwork output defines a channel of the respective coefficient, and the one or more subsequent decoder subnetwork outputs define a position and a value of the respective coefficient.

6. The method of claim 1, wherein, for the first decoder subnetwork, the embedding of the input sequence is processed using the one or more cross-attention layers of the first decoder subnetwork and an input generated from the plurality of output tokens generated at previous time steps is processed using the one or more self-attention layers of the first decoder subnetwork.

7. The method of claim 1, wherein, for each subsequent decoder subnetwork, the embedding of the input sequence is processed using the one or more cross-attention layers of the subsequent decoder subnetwork and an input generated from the decoder subnetwork output generated by the previous decoder subnetwork in the sequence is processed using the one or more self-attention layers of the subsequent decoder subnetwork.

8. The method of claim 1, wherein each output element has a respective first value defined by the first decoder subnetwork output and one or more additional values that are each defined by a respective subsequent decoder subnetwork output generated by one of the subsequent decoder subnetworks.

9. A system comprising one or more computers and one or more storage devices storing instructions that when executed by the one or more computers cause the one or more computers to perform operations for processing an input sequence using a generative neural network to generate an output sequence having a plurality of output elements, wherein:

the generative neural network comprises an encoder subnetwork and a sequence of a plurality of decoder subnetworks, the encoder subnetwork comprises one or more self-attention layers, each decoder subnetwork in the sequence of decoder subnetworks comprises i) one or more self-attention layers and ii) one or more encoder-decoder self-attention layers, the operations comprising:

processing an encoder subnetwork input comprising the input sequence using the encoder subnetwork to generate an embedding of the input sequence; and at each of a plurality of time steps:

processing, using the first decoder subnetwork in the sequence of decoder subnetworks, a first decoder subnetwork input generated from i) the embedding of the input sequence and ii) a plurality of output tokens generated at previous time steps to generate a first decoder subnetwork output;

for each subsequent decoder subnetwork in the sequence of decoder subnetworks:

processing, using the subsequent decoder subnetwork, a subsequent decoder subnetwork input generated from i) the embedding of the input sequence and ii) the decoder subnetwork output generated by the previous decoder subnetwork in the sequence of decoder subnetworks to generate a subsequent decoder subnetwork output; and generating a new output element in the output sequence using the decoder subnetwork outputs.

10. The system of claim 9, wherein the output elements in the output sequence represent an output image.

11. The system of claim 10, the operations further comprising:

generating the output image from the output elements in the output sequence.

12. The system of claim 11, wherein the output elements in the output sequence specify a plurality of coefficients of a lossy compression algorithm; and wherein generating the output image comprises decoding the output image by applying the lossy compression algorithm to the plurality of coefficients.

13. The system of claim 12, wherein each output element represents a respective coefficient, and:

the first decoder subnetwork output defines a channel of the respective coefficient, and the one or more subsequent decoder subnetwork outputs define a position and a value of the respective coefficient.

14. The system of claim 9, wherein, for the first decoder subnetwork, the embedding of the input sequence is processed using the one or more cross-attention layers of the first decoder subnetwork and an input generated from the plurality of output tokens generated at previous time steps is processed using the one or more self-attention layers of the first decoder subnetwork.

15. The system of claim 9, wherein, for each subsequent decoder subnetwork, the embedding of the input sequence is processed using the one or more cross-attention layers of the subsequent decoder subnetwork and an input generated from the decoder subnetwork output generated by the previous decoder subnetwork in the sequence is processed using the one or more self-attention layers of the subsequent decoder subnetwork.

16. The system of claim 9, wherein each output element has a respective first value defined by the first decoder subnetwork output and one or more additional values that are each defined by a respective subsequent decoder subnetwork output generated by one of the subsequent decoder subnetworks.

17. One or more non-transitory computer storage media storing instructions that when executed by one or more computers cause the one or more computers to perform operations for processing an input sequence using a generative neural network to generate an output sequence having a plurality of output elements, wherein:

the generative neural network comprises an encoder subnetwork and a sequence of a plurality of decoder subnetworks, the encoder subnetwork comprises one or more self-attention layers, each decoder subnetwork in the sequence of decoder subnetworks comprises i) one or more self-attention layers and ii) one or more encoder-decoder self-attention layers, the operations comprising:

processing an encoder subnetwork input comprising the input sequence using the encoder subnetwork to generate an embedding of the input sequence; and at each of a plurality of time steps:

processing, using the first decoder subnetwork in the sequence of decoder subnetworks, a first decoder subnetwork input generated from i) the embedding of the input sequence and ii) a plurality of output tokens generated at previous time steps to generate a first decoder subnetwork output;

for each subsequent decoder subnetwork in the sequence of decoder subnetworks:

processing, using the subsequent decoder subnetwork, a subsequent decoder subnetwork input generated from i) the embedding of the input sequence and ii) the decoder subnetwork output generated by the previous decoder subnetwork in the sequence of decoder subnetworks to generate a subsequent decoder subnetwork output; and generating a new output element in the output sequence using the decoder subnetwork outputs.

18. The computer storage media of claim 17, wherein the output elements in the output sequence represent an output image.

19. The computer storage media of claim 18, the operations further comprising:

generating the output image from the output elements in the output sequence.

20. The computer storage media of claim 19, wherein the output elements in the output sequence specify a plurality of coefficients of a lossy compression algorithm; and wherein generating the output image comprises decoding the output image by applying the lossy compression algorithm to the plurality of coefficients.

* * * * *